Aug. 25, 1959   H. W. CHAPMAN ET AL   2,900,864
GROOVED PIN HAVING A LATCH PLATE WITH AN ARROW-SHAPED OPENING
Filed Jan. 7, 1955
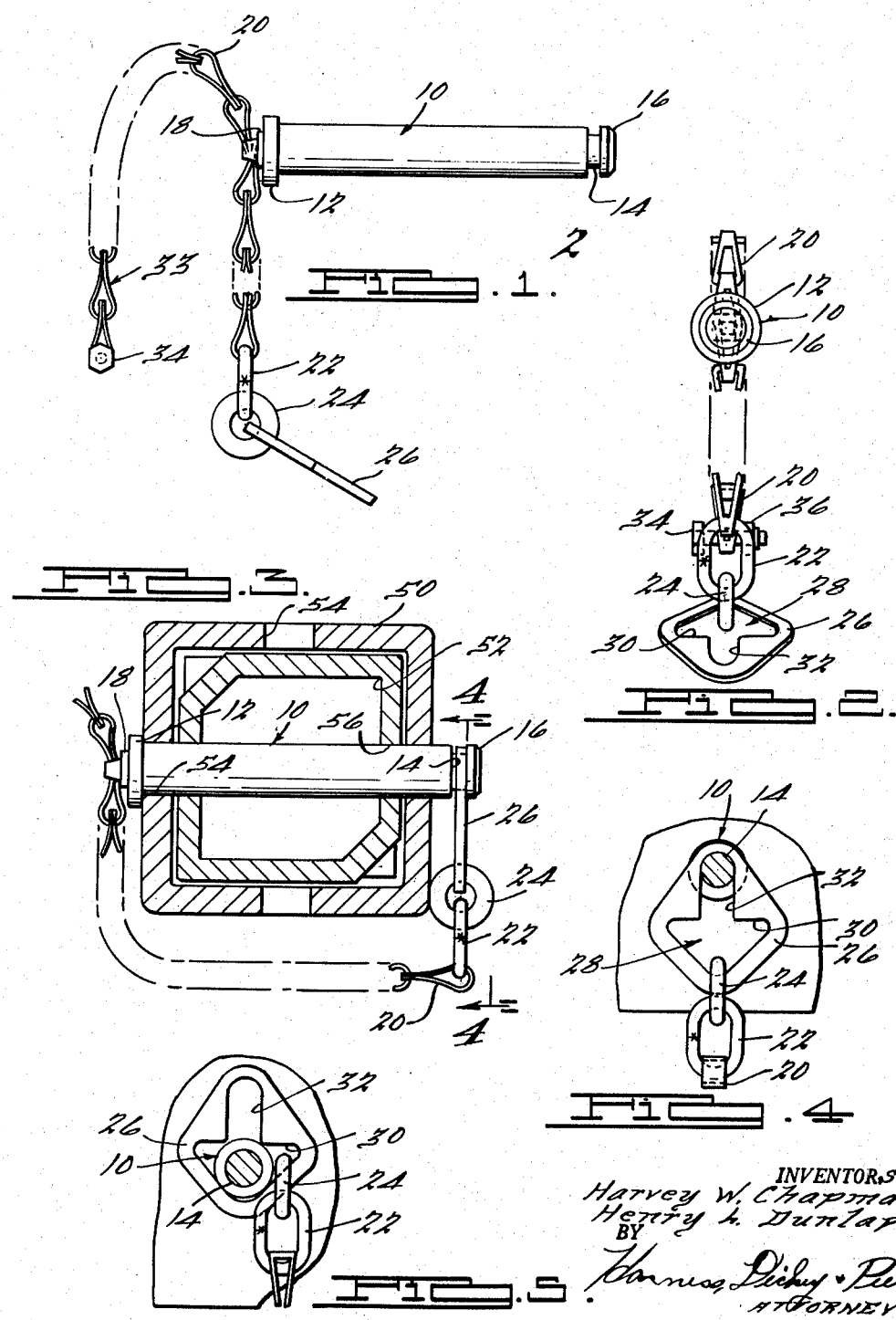
INVENTORS.
Harvey W. Chapman.
Henry L. Dunlap.
BY
ATTORNEYS.

United States Patent Office 2,900,864
Patented Aug. 25, 1959

2,900,864

GROOVED PIN HAVING A LATCH PLATE WITH AN ARROW-SHAPED OPENING

Harvey W. Chapman, Detroit, and Henry L. Dunlap, Dearborn, Mich., assignors to Evans Products Company, Plymouth, Mich., a corporation of Delaware Application January 7, 1955, Serial No. 480,396

1 Claim. (Cl. 85—8.9)

The present invention relates generally to a freight securing means and more specifically to a latch pin and lock plate assembly for securing members together, particularly for securing telescopic freight bracing members against telescopic movement.

In our copending application, Serial No. 457,474, filed September 21, 1954, now Patent No. 2,834,304, issued May 13, 1958, there is disclosed a system of freight loading apparatus which employs opposed, aligned patterns of fixed structural members on two surfaces enclosing a freight-supporting area, usually one pattern on the freight-supporting surface itself and another supported on the overhead above the latter, which fixed structural members have on their exposed surfaces a pattern of holes and/or lines of holes in which reusable bracing and dunnage members may be anchored by means of pins. In the above mentioned copending application, there is disclosed a freight bracing member having an auxiliary snugging member secured thereto by means of a lock pin, the snugging member being adjustable outwardly of the member by moving the lock pin to the appropriate hole in the plate-like snugging member. In the same application there is disclosed in Figures 14 and 16, a vertical freight bracing member having telescopically adjustable end fittings which are sometimes required to be locked against telescopic movement by means of a lock pin passed entirely through the member. In another of our copending applications, Serial No. 480,549, filed January 7, 1955, there is disclosed a remotely-operated freight bracing member or bar on which the end fittings are operated, that is, locked and unlocked, by means of appropriate telescopic movements of the body of the member toward and away from the end fitting in question. This freight bracing member also must be locked against telescopic movement in some use applications where load or shifting of cargo might accidentally operate the remotely-operated latch fitting.

It is a principal object, therefore, to provide a lock and latch pin-plate assembly for locking the aforementioned telescopic or adjustable members against telescopic movements and for securely locking any other two members together.

Another object is to provide a simple, inexpensive lock plate assembly for the above and other uses, which assembly can not be accidentally disengaged to release the locked members.

Other objects and advantages of this invention will be apparent, or will become apparent in the description to follow, especially when taken in conjunction with the accompanying drawings in which:

Figure 1 is a side view showing the lock and latch plate assembly of this invention, the figure showing in particular the way in which the chain and lock plate assembly is secured to the bolt or lock pin;

Fig. 2 is a side or end view of the lock and latch-plate assembly of Figure 1, the view being taken in the direction of the arrow 2 of Figure 1;

Fig. 3 is a transverse sectional view through a typical freight bracing member showing the lock and latch place assembly of this invention installed thereon to secure the member against telescopic movements of its parts;

Fig. 4 is an end view showing the lock plate on the bolt or lock pin, the figure being viewed generally along the line 4—4 of Fig. 3; and Fig. 5 is an end view of the bolt and lock pin illustrated in Fig. 4 in an unlocked position and ready to be disengaged from one another.

In accordance with this invention, a latch pin and lock plate assembly is provided wherein the latch-plate fits over, or is secured to a latching means or groove on the one end of a lock pin. The latch-plate itself is so designed with a slot-like groove that the weight of the plate, the attached chain, etc. will keep it in place. If desired, a second moveable member can be attached to the latch plate in such a position to positively lock the latch-plate against movement out of the groove in the pin.

Referring now specifically to the accompanying drawings and particularly to Figs. 1 and 2 thereof, it will be seen that the lock and latch-plate assembly of this invention comprises a cylindrical tube or solid bar 10 having a shoulder portion 12 on one end and on the other end a circumferential groove or slot 14 and a tapered nose 16. In the shouldered end of tube or bar 10, there is provided a hole into which is fitted a rivet or bolt 18 which is screwed or driven in and then peened securely to form a small rounded end. A length of strap link chain 20 is first flattened and then laid against the peened end of rivet or bolt 18 and then tack-welded thereagainst. As will be noted, the chain 20 is secured to the rivet 18 so as to leave a length on each side of the rivet; one such length should be sufficiently long to reach around to the other end of the bar or bolt 10 and the other, a convenient length to affix the assembly to a structure or member in which it is to be used. In one end of the chain 20 there is secured a loop 22 and a ring 24, the latter being passed through a latch-plate 26. The latter part is seen more clearly in Figure 2. As will be seen in the latter figure, the latch-plate 26 has an arrow-head shaped opening 28, having horizontally extending portions 30, a vertical slot-like portion 32 and intersecting tapered sides 31. The other end of chain 20, indicated by the numeral 33, is provided with a small bolt 34 having a nut 36 for affixing the assembly to a freight bracing member or to act as a double lock on the latch plate, as will be more fully described below.

If it is desired to utilize the assembly in a vertical position the latch-plate 26 can be given a 90 degree bend in the plane of the plate in the region of the slot-like portion 32 of the opening 28. This would permit the ring 24 to assume its blocking position under the force of gravity.

The assembly of Figs. 1 and 2 is operated by inserting the bar 10 through a hole or holes in the member or members to be locked, its tapered end 16 facilitating this, and the latch plate 26 brought around to be placed in the groove 14. This is accomplished by pushing ring 24 out of the way into one of horizontal portions 30 of opening 28, passing the tapered end 16 of bolt 10 through the enlarged area at the intersections of horizontal portions 30, tapered sides 31 and vertical slot 32, rotating the latch plate 26 until the vertical opening 32 is over the slot 14 and releasing to allow the weight of the chain to seat it in the slot or groove 14. In this position the end of the bar, pin or bolt 10 can be unlocked only by pushing aside the ring 24, raising the latch plate to move the vertical slot 32 out of engagement with slot 14 and then pulling outwardly to withdraw the latch plate over the end of the pin 10. It is very unlikely that all these motions and forces can be exerted on the latch plate by accident during use by bumping or joggling the latch plate. The weight of ring 24, loop 22 and chain 20 attached thereto will force the ring 24 to slide down the tapered sides 31 to block the largest dimension of opening 28 and prevent lifting of latch plate out of the slot or groove 14. To make doubly sure, however, the other end 33 of the chain 20 can be brought around, the bolt 34 passed through one side of the horizontal opening 30 in the latch plate 26, and the nut 36 replaced. In either case, the weight of chain "ties down" the latch plate. For this purpose ring 24 need not be attached to bolt 10, this being done only to prevent loss of latch plate itself.

In Fig. 3 there is illustrated a typical use of the latch plate and lock pin assembly of this invention. The figure shows a cross section through a telescopic freight bracing member having an outer body member 50 and an inner slide member 52. In the outer body there are a plurality of regularly spaced holes 54 in each its sides. Likewise, the slide member has a plurality of holes 56, similarly spaced so as to be aligned with the holes 54. To fix the length of the member, therefore, a pair of holes 54 in the body member 50 are aligned with a pair of holes 56 in slide 52 and the lock pin 10 pushed through. The chain 20 is then brought around, the latch plate 26 slipped over the end 16 and rotated so as to seat itself in slot 14. The member is then positively locked against telescopic movements of its parts.

Fig. 4 most clearly illustrates the manner in which the slot 32 of the latch plate 26 seats itself in the slot 14 and further the manner in which the chain 20, loop 22 and ring 24 depend downwardly from the plate so as to normally maintain the plate in the position illustrated by their weight. To disengage the plate 26 from the pin 10, the ring 24 is moved to the side of the horizontal portion 30 of the arrow-shaped opening as illustrated in Fig. 5 and the entire latch plate is lifted until the pin clears the slot 32 to permit the latch plate 26 to be slipped over the end of the pin. Of course, should the latch plate 26 be raised accidentally relative to the pin 10 without first moving the ring 24 to the position illustrated in Fig. 5, it is apparent that the ring will prevent the pin from clearing the slot 32.

The latch plate and lock pin assembly of this invention is an inexpensive and easily made locking device which is positive in action and is most convenient to use. The assembly is particularly adapted to use as a locking device for the telescoping parts of freight bracing members, for the locking of dunnage members to other bracing members, to the deck or to overhead members, and other uses in freight securing systems. The assembly will find wide use wherever it is desired to lock two or more hole-bearing members together.

What is claimed is:

A latch pin and plate assembly comprising an elongated bolt member having a shouldered portion on one end and a groove near the other end, a length of flexible connecting member affixed to said shouldered end of said bolt member, a loop member affixed to a free end of said connecting member, and a latch plate affixed to said loop member, said latch plate having a generally arrow-shaped opening through which said loop member passes, a slot-like portion of said opening corresponding to the shank of the arrow being adapted to fit in said groove, the side portions of said opening corresponding to the barbs of the arrow being large enough to receive said loop and permit the passage of the grooved end of said bolt member through said opening, and the size of the material of the loop itself being sufficient when located at the point of the arrow to prevent withdrawal of said plate from said groove, the weight of said flexible connecting member normally maintaining said loop member at the point of the arrow-shaped opening.

References Cited in the file of this patent

UNITED STATES PATENTS

| | | |
|---|---|---|
| 447,876 | Hayden | Mar. 10, 1891 |
| 828,573 | Rubin | Aug. 14, 1906 |
| 1,351,119 | Ogden | Aug. 31, 1920 |
| 1,599,727 | Stewart | Sept. 14, 1926 |
| 1,734,610 | Banks | Nov. 5, 1929 |
| 2,000,757 | Holczer | May 7, 1935 |
| 2,117,393 | Bateson | May 17, 1938 |
| 2,246,359 | Jelinek | June 17, 1941 |
| 2,621,064 | Ware | Dec. 9, 1952 |
| 2,625,358 | Griffin | Jan. 13, 1953 |

FOREIGN PATENTS

| | | |
|---|---|---|
| 36,448 | Sweden | Apr. 1, 1914 |